United States Patent Office 2,697,102
Patented Dec. 14, 1954

2,697,102

PRODUCTION OF THE EXOCIS ISOMER OF 3,6-ENDOXO-1,2,3,6-TETRAHYDROPHTHALIC ANHYDRIDE

John F. Olin, Grosse Ile, Mich., assignor to Sharples Chemicals Inc., a corporation of Delaware No Drawing. Application November 26, 1949,
Serial No. 129,699

4 Claims. (Cl. 260—346.6)

The present invention relates to a process for the preparation of 3,6-endoxo-1,2,3,6-tetrahydrophthalic anhydride. More particularly, it relates to a process which embodies numerous outstanding advantages as compared to processes hitherto employed for the preparation of said compound. Still more particularly, it relates to an improved process in which reactants appropriate for the preparation of said compound are brought together and reacted with each other under novel and highly favorable conditions.

It is well known that 3,6-endoxo-1,2,3,6-tetrahydrophthalic anhydride may be prepared by condensing equimolar proportions of furan and maleic anhydride while dissolved in non-polar solvent media by the well-known Diels-Alder reaction.

Contrary to the teachings of the prior art, I have discovered that this condensation also may be effected substantially quantitatively, provided that no considerable quantity of mutual solvent for the reactants is present.

It is a feature of the process of this invention that the reaction may be conducted in the substantial absence of a mutual solvent for the reactants.

In the conduct of the process, the reactants are thoroughly mixed after they are brought together, and as the reaction proceeds. Mixing is such that the reactants are brought into intimate contact with each other throughout the reaction.

The reaction is carried out at temperatures below 100° C. Any suitable lower temperature may be employed. Usually a temperature will be employed at which the reaction proceeds at a reasonable rate such as, above 0° C. and particularly above 20° C. Thus the preferred temperature ranges are between 0° C. and 100° C., and more particularly between 20° C. and 75° C.

3,6-endoxo-1,2,3,6-tetrahydrophthalic anhydride is well-known, but in all previous furan-maleic anhydride condensation procedures of which the applicant is aware, said compound has been obtained as a result of reacting furan and maleic anhydride while dissolved in non-polar solvent media. For example, ether was employed as reaction solvent by Diels, Alder and Naujoks, Ber. 62B, 554; also by Diels and Alder, U. S. 1,944,731. Von Bruchhausen and Bersch, Arch. Pharm. 266, 697, employed benzene as reaction solvent, and Diels and Olson, J. prakt. Chem. 156, 285, employed dioxane for the same purpose.

In the practice of the present process, the resulting product is the same isomer as the one obtained by the procedure which employs ether as solvent. This is the exo-cis isomer as defined by Woodward and Baer, J. Am. Chem. Soc. 70, 1161–1166, and it is to be understood that this is the isomer which is meant when the term 3,6-endoxo-1,2,3,6-tetrahydrophthalic anhydride is used herein. The endo-cis isomer is theoretically capable of existing, and indeed the presence of its corresponding dicarboxylic acid in a furan-maleic acid-water system has been reported in the literature.

The present process, which provides a simple, direct, and economical method for the preparation of 3,6-endoxo-1,2,3,6-tetrahydrophthalic anhydride by reacting furan and maleic anhydride in the substantial absence of a mutual solvent for said reactants, possesses the distinct and outstanding advantages which are discussed below.

Important economies are gained because of greatly simplified operation. A much larger yield of product is obtained per unit of reactor volume. Furthermore, the product as discharged from the reactor is a finished product, and hence requires no further processing. Therefore the number of essential steps is materially reduced. For example, the step of separating product from solvent by filtration is eliminated, and the step of removing residual solvent from the product is likewise eliminated. Means for recovery and storage of solvent are not required, nor is there any need for recovering from the solvent that portion of the product which may be dissolved therein. The elimination of such processing steps results in a marked reduction of the overall time cycle required for preparation of the product. These simplifications lead to noteworthy economies in raw material costs, labor costs, and equipment requirements. This improved process, therefore, permits the production of 3,6-endoxo-1,2,3,6-tetrahydrophthalic anhydride at greatly reduced cost.

It is stated above that the fact that this improved process yields a product which does not contain residual solvent is economically advantageous. This fact is equally advantageous from the standpoint of obtaining a product of high purity. This is because the product is unstable at the higher temperatures usually required for the purpose of complete removal of residual solvent by distillation.

Moreover, by the practice of the process, the desired anhydride is obtained as a finely-crystalline, free-flowing, white powder, without the need or necessity of further processing steps, such as those of pulverizing, classifying, and screening, for example, to obtain a uniform product. In such form the product is eminently suited for employment for many purposes, such as an intermediate for further, immediate chemical processing. For example, it may be readily dissolved in water, neutralized with a suitable base, and in this form be hydrogenated to a derivative of 3,6-endoxohexahydrophthalic acid.

Furthermore, the improved process minimizes hazards such as those of health and safety. Both maleic anhydride and 3,6-endoxo-1,2,3,6-tetrahydrophthalic anhydride possess vesicant properties, while furan displays physiological action which resembles that of benzene. The small amount of handling which is inherent in this process minimizes danger to the health of operators who work with these compounds. Additionally, the hazards which are always present to a greater or lesser degree in any process which employs volatile organic solvents do not exist in the preferred practice of this process.

In the preferred procedure for practicing the invention, stoichiometric amounts of furan and maleic anhydride are reacted in an efficient mixer. Various types of mixers may be used, but mixers of the kneading type are very suitable for the purpose. Jacketed, hollow-arm mixers of the kneading type are especially suitable, owing to the ease with which heat of reaction and/or of friction may be transferred to the cooling water which is commonly employed with such mixers. The well-known Baker-Perkins mixer is well suited to the purpose.

In this preferred procedure, maleic anhydride is placed in the mixer and the mixer is sealed and started, at which time addition of furan is commenced. Such addition is gradually continued until the total amount of furan added is stoichiometrically equivalent to the maleic anhydride which was charged to the mixer. The time of addition ordinarily may vary from about one hour in the case of small runs to about eight hours in the case of large runs. The rate of addition is dependent upon the efficiency of heat transfer of the particular mixer being used so that the temperature will not go too high. Upon initial addition of furan, reaction sets in and the temperature begins to rise. The temperature may be controlled by circulating water, cold or hot as needed, through the jacket of the mixer for the purpose of maintaining the desired temperature. The temperature is maintained below 100° C. and preferably below 75° C. In a closed mixer, a moderate super-atmospheric pressure tends to build up during the early stages of the reaction, but decreases as furan is consumed by reaction. After all the furan is added, mixing is continued for a time, say a few hours or less, to insure completeness of reaction. During this period, temperature conditions are maintained substantially as before. Mixing is discontinued, the mixer is opened, and 3,6-endoxo-1,2,3,6-tetrahydrophthalic anhydride is discharged into suitable containers. The product is a finely-crystalline, free-flowing, white powder which is suitable for such uses as have already been mentioned.

The following examples provide illustrations of the practice of the invention in the preparation of 3,6-endoxo-1,2,3,6-tetrahydrophthalic anhydride.

Example 1

Into a 0.7 gallon working-capacity, jacketed, solid-arm, kneading-type, stainless steel mixer was placed 588 g. (6 moles) of maleic anhydride. The mixer was closed and started. Addition of furan into the mixer and passage of cooling water through the jacket were commenced. 408 g. (6 moles) of furan was gradually added over the course of one hour. The temperature inside the mixer was 26° C. at the beginning of furan addition and at the end it was 50° C.; the maximum temperature noted was 53° C. The maximum pressure noted was 13 p. s. i. g.; at the end of the one hour period it was 1.5 p. s. i. g.

Mixing was continued for five hours, during which time the temperature inside the mixer was maintained between 47° C. and 53° C. by passing warm water through the jacket. During the five hours of continued mixing, pressures ranging from 2 p. s. i. g. to 0 p. s. i. g. were observed.

Passage of warm water was discontinued at the end of the fifth hour; the mixer was vented and was then held under reduced pressure below 15 mm. Hg for one hour while mixing continued. The mixer was then stopped, opened, and completely discharged. The 3,6-endoxo-1,2,3,6-tetrahydrophthalic anhydride thus obtained weighed 961 g., a yield of 96.5%.

Example 2

525 pounds of maleic anhydride was charged into a 200 gallon working-capacity, jacketed, hollow-arm, kneading-type stainless steel mixer, the mixer having been started before this charging. The maleic anhydride was of a commercial flake form and had a 52° C. minimum set point. The mixer was closed and 361 pounds of commercial-grade furan was gradually added during 7¼ hours. Cool water was passed through the jacket and hollow mixing arms throughout the addition of furan. The reaction temperature was thus maintained between a minimum of 30° C. and a maximum of 60° C., the average reaction temperature being 38° C. The pressure at no time exceeded 14 p. s. i. g.; the average pressure was 6 p. s. i. g.

After the addition of furan, mixing was continued for 1½ hours. Cool water was continuously passed through the jacket and hollow mixing arms. The average inside temperature of the mixer during this period of continued mixing was about 38° C. and the final temperature was 35° C. The mixer was stopped and the discharge hole at the bottom of the mixer was opened. The mixer was again started, and the product was discharged directly into containers.

The 3,6-endoxo-1,2,3,6-tetrahydrophthalic anhydride thus obtained weighed 806 pounds, or a yield of 91.4%. A small amount was left in the mixer, and it was estimated that had this been removed the total yield would have been nearly quantitative. It is not necessary to remove this small residual amount from the mixer before the next run is made.

The product as discharged from the mixer was a finely-crystalline, free-flowing, white powder of excellent appearance. The neutral equivalent was found to be 83 as compared to a theoretical value of 83.

Having more particularly described the invention, it is to be understood that this is by way of illustration and that modifications may be made within the scope of the claims without departing from the spirit of the invention. For example, it is to be understood that mixers of types other than those specifically mentioned may be used. Also, it is not mandatory that the reaction temperature be controlled by passage of water through the jacket and/or arms of the mixer. Other means of temperature control may be used, for example by addition of furan to the reacting mass at rates somewhat slower than those specifically mentioned. Furthermore, the order in which the chemicals are added to the mixer may be reversed, that is, furan may be placed in the mixer and maleic anhydride added thereto, or the reactants may be added simultaneously. It is also possible to use an excess of either reactant, in cases where purity of product is not essential, or where the excess reactant is subsequently removed, such as by the use of vacuum technique as illustrated in Example 1. Still another modification which falls within the scope of the invention is bringing the reactants into intimate contact with each other at temperatures substantially in excess of the upper limit set forth above, followed by cooling to temperatures employed herein, although this procedure may suffer from the disadvantage of causing objectionably high pressures and/or undesirable side reactions. The final mixing is then conducted under temperature conditions below 100° C. and preferably below 75° C.

Furthermore, the process may if desired be operated continuously rather than batchwise. In order to provide for continuous operation, it is merely necessary to bring furan and maleic anhydride into mutual contact in a continuous mixer, and then to force the reacting mass through said mixer at temperatures as described above and at rates suitable for carrying the reaction substantially to completion, and finally to discharge the desired product from the mixer.

While it is contemplated that in the best practice of the invention, substantially no mutual solvent for the reactants shall be present, it is possible to realize certain advantages of the invention even though a small amount of a mutual solvent might be present for any reason, such as up to 5%, and more particularly up to 3% based on the weight of the reactants. Such amounts of solvent might be removed from the reactor prior to discharging of the product following procedure such as illustrated in Example 1.

These and other modifications will occur to persons skilled in the art upon becoming familiar herewith.

Accordingly, it is intended that the patent shall cover by suitable expression in the claims the features of patentable novelty which reside in the invention.

I claim:

1. A process for the production of the exo-cis isomer of 3,6-endoxo-1,2,3,6-tetrahydrophthalic anhydride in high purity which comprises gradually contacting in the substantial absence of a mutual solvent therefor and finally in substantially stoichiometric amount furan and maleic anhydride, said contact taking place in a closed system and with continual thorough kneading of the entire reaction mass while maintaining temperature conditions throughout the entire reaction mass by virtue of said gradual contacting and of said kneading and of heat exchange below 100° C. to produce a crystalline free-flowing white reaction product comprising substantially only exo-cis-3,6-endoxo-1,2,3,6-tetrahydrophthalic anhydride of high purity.

2. The process of claim 1 in which temperature conditions are maintained between 0° C. and 100° C.

3. The process of claim 1 in which temperature conditions are maintained between 20° C. and 75° C.

4. The process of claim 1 in which the furan is added to the maleic anhydride.

References Cited in the file of this patent

UNITED STATES PATENTS

| Number | Name | Date |
|---|---|---|
| 2,471,790 | Sowa | May 31, 1949 |